Feb. 15, 1966    H. F. MARTIN    3,234,933
SELF-CONTAINED VIBRATOR UNIT
Filed March 29, 1963    2 Sheets-Sheet 1
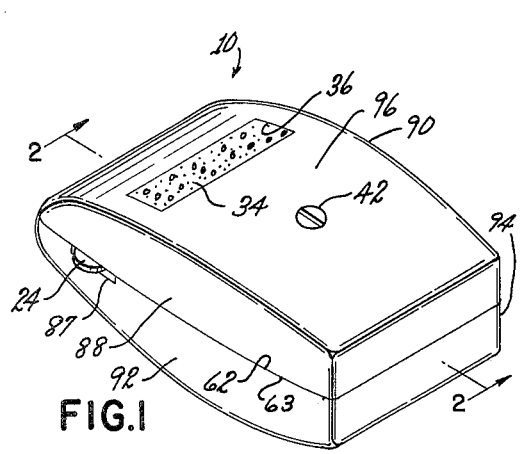
FIG.1
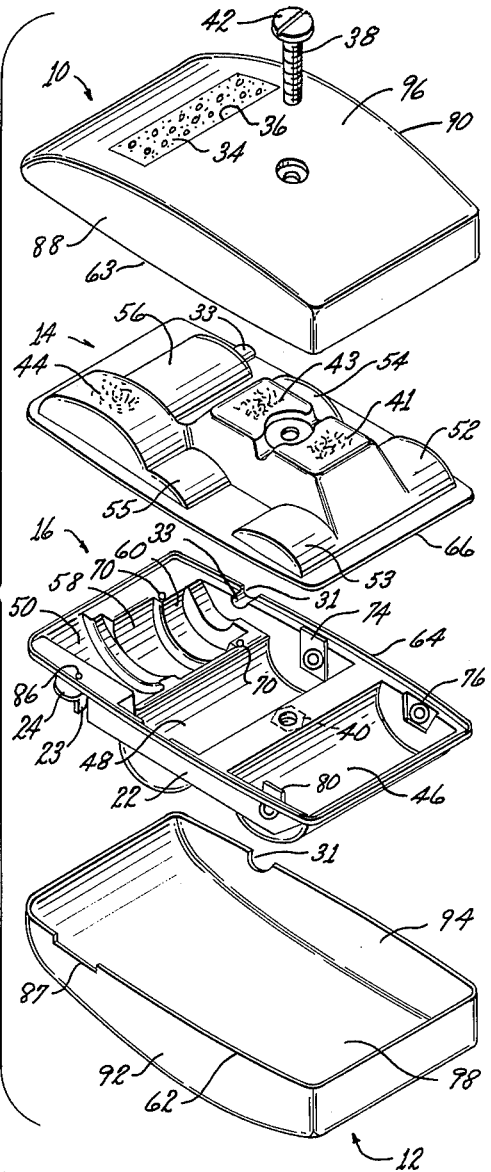
FIG.3
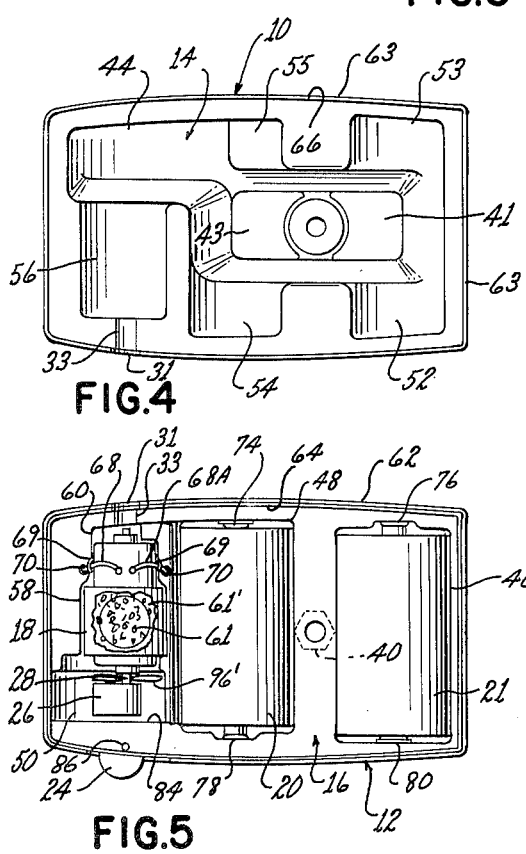
FIG.4
FIG.5
INVENTOR.
HOWARD F. MARTIN
BY
HIS ATTORNEYS Feb. 15, 1966      H. F. MARTIN      3,234,933
SELF-CONTAINED VIBRATOR UNIT Filed March 29, 1963      2 Sheets-Sheet 2

INVENTOR.
HOWARD F. MARTIN

BY

*Cauder Tauder*

HIS ATTORNEYS

United States Patent Office 3,234,933
Patented Feb. 15, 1966

3,234,933
SELF-CONTAINED VIBRATOR UNIT
Howard F. Martin, Wilmington, Ohio, assignor to Three Star Creation, Inc., Trotwood, Ohio, a corporation of Ohio
Filed Mar. 29, 1963, Ser. No. 269,089
11 Claims. (Cl. 128—36)

This invention relates to a self-contained vibrator unit which may be readily held in the hand of a person, and which may be applied to the body of a person to impart pleasant and beneficial vibrations and massaging actions.

The vibrator unit has a construction and a method of making such construction that produces a very efficient and attractive vibrator unit.

The vibrator unit may have a casing made of two outer cupped shells and two inner shells which may be secured in the outer shells. A motor and attached vibrating element, one or more batteries, electric circuit wiring, battery connectors, and a control switch may be secured to one or both inner shells, with a manipulator for the switch to extend out of the casing.

The construction is such that these shells may be secured together with the rims of the cupped outer shells adjacent each other. The parts of the casing may be secured together by an easily manipulated, easily attachable and detachable, securing means. Any exhausted battery or batteries may be easily replaced merely by opening the casing with the use of such securing means and then removing the exhausted battery or batteries and replacing them with a new battery or batteries. The parts of the casing may then be easily reunited with the use of such easily manipulated securing means.

The construction lends itself to the use of plastic material for the casing members. The outer shells are so shaped that they produce a somewhat elongated self-contained vibrator unit which may be easily held in a person's hand and which may be easily and pleasantly applied to the body of a person without any injurious effects from sharp corners, plug-in cords, and the like.

This invention may be a combination forming a self contained vibrator unit which may be readily held in the hand of a person and which may comprise a casing, which may be made of plastic material, said casing having two relatively flattened side walls joined by decidedly arched upper and lower walls and opposite end walls to form a hollow body of relatively long length, with relatively flattened side walls, with centrally outwardly decidedly arched upper and lower walls, with a rounded vibration applying end and a handhold end, and with said motor being adjacent said vibration applying end, and with one battery centrally located in said casing and the other battery located adjacent the handhold end.

The invention provides many other desirable features which are apparent from this description, the appended claimed subject matter, and/or the accompanying drawings, in which:

FIGURE 1 is a perspective view of one embodiment of this invention.

FIGURE 3 is a perspective exploded view of the shell members.

FIGURE 4 is a bottom view of the upper inner shell member shown in FIGURE 3, with the rim of the upper outer shell surrounding the flat rim of the upper inner shell.

FIGURE 5 is a top view of the lower inner and outer shell members shown in FIGURE 3 with the motor and batteries added, and with the flanged rim of the lower inner shell extending beyond the rim of the lower outer shell.

Figure 6:
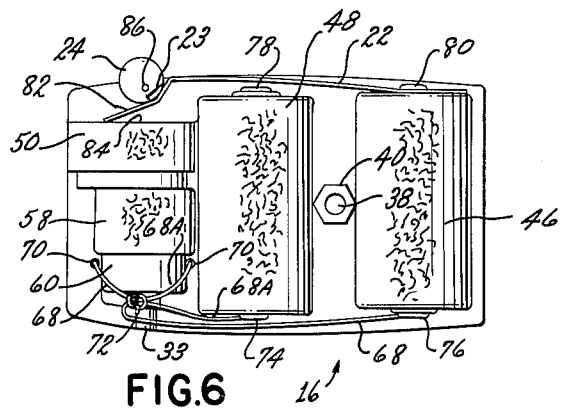
FIGURE 6 is a bottom view of the lower inner shell member shown in FIGURE 5, detached from the lower outer shell.

Certain words are used herein which, for convenience, indicate direction, relative position, and the like. It is to be understood that such words are used only in connection with the specific showing and position of the figures in the drawings for the sake of clarity and brevity of description. However, it is to be understood that the members, parts and motions so described may be entirely different in the actual embodiment as made and used, as is obvious. Examples of such words are "upper," "lower," "vertical," "horizontal," "rightward," "leftward," etc.

The construction and the method of making the vibrator or massager of this invention are such that a very efficient and attractive vibrator or massager is produced, as will become more fully apparent as the description proceeds.

Two outer cupped shells 10 and 12 and two inner shells 14 and 16 may be made of molded plastic, if desired. They are so shaped that the outer shells 10 and 12 may be easily held in the user's hand and may be readily applied to any part of the body to effect a very pleasant and beneficial massage.

One embodiment of the invention may have a casing which may include the two outer cupped shells 10 and 12 and the two inner shells 14 and 16.

A motor 18 and battery means which may include one or more batteries 20 and 21 may be secured within such casing and be connected together with an electric circuit producing construction. A switch for opening and closing such circuit may include a switch blade 22 and a combined switch blade actuator 23 and manipulator 24. The manipulator 24 may extend outside of the casing, to be rotated, pushed in, or otherwise manipulated by the user.

The motor 18 may be provided with a vibrator member, such as a rotatable eccentric weight 26 which may be a circular disc eccentrically mounted on the motor shaft 28. The speed of rotation of the motor shaft 28 and eccentricity and mass of the weight 26 may be coordinated to impart the desired vibration to the casing. The casing may be applied to any part of the body of a person to impart beneficial vibrations and massaging actions to such body without the inconvenience of any connecting electrical plug-in cord.

The shells 10, 12, 14 and 16 are shaped so the motor, batteries, electrical connectors and switch may be effectively secured within the casing, so the casing may be effectively closed and opened by a simple attachment means. For example, the casing may be opened and closed by the easy insertion or removal of a screw bolt 38 into or out of the nut 40. The nut may be molded into the inner shell 16, if desired. The screw head 42 may engage and hold the upper outer shell 10 and its attached upper inner shell 14 in casing closing relationship with the lower outer shell 12 and its attached inner shell 16.

The upper inner shell 14 is made so that it can be secured to and within the upper outer shell 10. For example, such inner shell 14 may be provided with certain recesses or cavities 41, 43 and 44 which may be secured to the inner surface of upper outer shell 10 as by means of a suitable adhesive which is shown by irregular markings in FIGURE 3.

Figure 2:
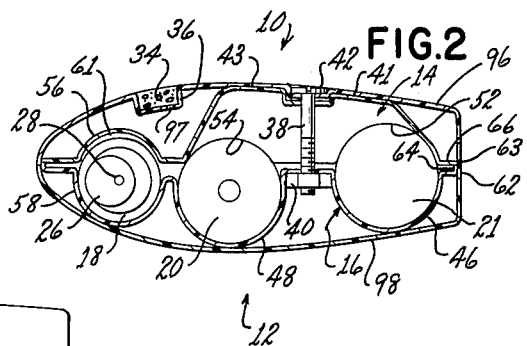
FIGURE 2 is a cross section along the line 2—2 of FIGURE 1.

The lower shell 16 is also made so that it can be secured to and within the lower outer shell 12. For example, such lower inner shell 16 may be provided with certain recesses or cavities 46, 48 and 50, FIGURES 2 and 6, which may be secured to the inner surface of the lower outer shell 12, as by means of a suitable adhesive, which is shown by irregular markings in FIGURE 6.

The upper inner shell 14 may have additional recesses or cavities 52, 53, 54 and 55 to receive and hold the upper parts of batteries 21 and 20 respectively. The shell 14 may have a recess or cavity 56 to receive upper part of the motor 18. The recess or cavity 44 receives the eccentric weight 26.

The cavities 46, 48 and 50 of the lower shell 16 may receive respectively the lower parts of the batteries 21, 20 and the eccentric weight 26. The lower shell 16 may also have recesses or cavities 58 and 60 which receive respectively the larger and smaller parts of the motor 18.

A pad 61 of resilient material may be adhered to the motor 18 with a loose edge 61' to hold the motor tightly between the recesses 56 and 58 to impart vibration to the shells.

It is thus to be seen that a sufficient number of the recesses or cavities in the inner shells 14 and 16 are made to have outer surfaces which may be adhesively secured respectively to the inner surfaces of the outer shells 10 and 12. The surfaces so provided are sufficiently large and extend into contact at sufficiently separated parts of the shells to produce a firm bond of the upper inner shell 14 to the upper outer shell 10, and of the lower inner shell 16 to the lower outer shell 12. These cavities also impart the vibrations of vibrator 26 to the outer shells. The adhesive bonding action may be produced at a proper time to permit proper assembly of the motor, wiring and connector parts to the lower inner shell 16 before it is adhered to the lower outer shell 12. Both of the inner shells 14 and 16 are bonded or adhered to the respective outer shells 10 and 12 before these shells are secured together by the screw 38.

The inner shells 14 and 16 are also made so that they provide proper lateral locking action where the rims 62 and 63 of the outer cupped shells 10 and 12 meet when they are assembled and locked by the screw 38. To this end, one of the inner shells, such as lower shell 16, has a rim 64 which is flanged upwardly and extends slightly above the rim 62 of the lower outer shell 12. The upper inner shell 14 has only a flat rim 66, with no flange, so the rim 63 of the upper shell 10 extends downwardly beyond the flat rim 66 of the upper inner shell 14.

The rim constructions of the shells are therefore made to interlock so that there is a locking action against sidewise displacement of the abutting rims 62 and 63 of the outer shells as they are brought against each other.

The motor 18 may be secured to the lower inner shell 16 before the shell 16 is adhered to the lower outer shell 12. To this end the motor 18 has firmly attached thereto a pair of insulated electrical conductors or wires 68 and 68A. These wires 68 may be held against the body of the motor 18 by tongues or clips 69, FIGURE 5. These wires are passed through openings 70 to the outside of the inner shell 16, as shown in FIGURE 6, where they are knotted together at 72 to hold the motor 18 in the cavities 58 and 60 tightly. The ends of the conductors 68A and 68 are then attached respectively to the rivetted negative battery connector 74 and to the rivetted positive battery connector 76. These connectors 74 and 76 are rivetted in the shell 16 and connected to the ends of the wires 68A and 68 after the shell has been molded. Additional rivetted battery connectors 78 and 80 may be rivetted to the inner shell 16 to receive and connect the corresponding ends of the batteries 20 and 21 to place the batteries in series circuit connection with each other and with the motor 18. The batteries 20 and 21 may be inserted in the inner shell 16 after it has been adhered to the outer shell 12. Also, the batteries 20 and 21 may be removed after they have been exhausted by opening the casing by unscrewing the screw 38 and by snapping the batteries out of their respective cavities 48 and 46. New batteries may then be inserted in these cavities, and the casing may then be closed again by screwing in the screw 38.

The switch blade 22 may be rivetted and connected in place by being rivetted with the connector 80 so it is connected to the battery 21. The switch blade 22 is spring biased away from the rivet connector 78 by the spring tongue end 82 of blade 22 which tongue end engages the end 84 of cavity 50.

The switch actuator 23 may be a disc which is rotatable about the pin 86, which is riveted to the shell 16. The disc is rotatable in the slot 87 of the lower shell 12, FIGURE 3. The actuator 23 may be a tongue which presses the blade 22 against the connector 78 and thereby closes the series circuit at the connectors 78 and 80 to energize the motor for rotation of the eccentric weight 26. Rotation of the manipulator portion 24 by the thumb of the user moves the tongue or actuator 23 to move the blade 22 into and out of contact with connector 78 respectively to energize and deenergize the motor 18.

The circuit includes motor 18, 68A, 74, 20, 78, 22, 80, 21, 76, 68 and motor 18. This is opened and closed by the switch blade 22 under the control of manipulator 24.

The cupped, outer shells 10 and 12 may each have two substantially flattened sides indicated respectively at 88, 90, 92 and 94, which are smoothly joined respectively by decidedly arched walls 96 and 98. The two motor and battery means supporting inner shells 14 and 16 are each in engagement with and are located respectively in a different one of the respective outer shells 10 and 12. The battery means may include one or more batteries 20 and 21.

A combination has been provided which forms a self-contained vibrator unit as shown in FIGURE 1, which may be readily held in the hand of a person and which may comprise a casing 10, 12, which may be made of plastic material, said casing having two relatively flattened side walls formed respectively by abutting sides 88, 92 and 90, 94. These flattened side walls are joined by decidedly arched upper and lower walls 96 and 98 to form a hollow body of relatively long length, with relatively flattened side walls 88, 92 and 90, 94, with centrally outwardly decidedly arched upper and lower walls 96 and 98 with a rounded vibration applying end, shown at the left end of FIGURE 2, and with a handhold end, which is the right portion of FIGURE 2, and which may be blunted, as shown in the near end of FIGURE 1 and the right end of FIGURE 2.

The generally cylindrical motor 18 is placed in said casing adjacent the vibration applying end with its shaft 28 transverse to the long length and with the rotatable eccentric 26 carried by such shaft. The central cylindrical battery 20 is placed in the central part of the casing transverse to said long length. The end cylindrical battery 21 is placed adjacent to the handhold end of the casing.

Electrical circuit means 68, 68A, 74, 76, may be provided for connecting the batteries 20 and 21 with the motor 18. Switch means 22, 24 operable from the outside of the casing at 24 controls the circuit means to energize and deenergize the motor 18, to provide vibration massage when desired.

The inner shell construction 14, 16 has a motor cavity 58 for receiving the motor 18 and has battery receiving cavities 48 and 46 for receiving the batteries 20 and 21 respectively.

Figure 7:
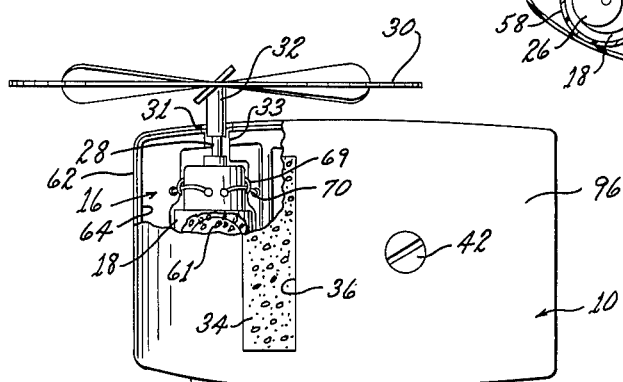
FIGURE 7 is a top plan view of FIGURE 1 with certain parts broken away and with the fan in place.
Figure 8:
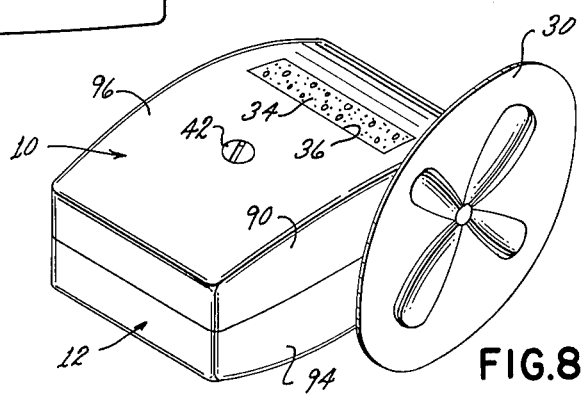
FIGURE 8 is a perspective view of FIGURE 7.

If desired, a fan or blower 30, FIGURES 7 and 8, may be conveniently attachable to and detachable from the other end of the motor shaft 28. The fan hub 32 may be insertable in and removable from openings 31 and channels 33 provided in shells of the casing to attach and detach the fan from the motor. The fan 30 may force or circulate the air in a direction toward or away from the casing, as desired.

A liquid holding material 34 may be placed in the path of the air circulated by the fan 30. This circulated air may pick up the liquid, or vapor therefrom, and apply it to the body of the person. Such liquid may be any desirable liquid, including a disinfectant, perfume, soothing lotion, and the like.

The liquid holding material 34 may be in the form of a pad of sponge rubber and the like which may be placed, and secured if desired, within a recess 36 which may be formed in one of the outer shells, such as shell 10.

A fan 96' may be provided on motor shaft 28 adjacent the weight 26. Openings 97 may be provided in the bottom of recess 36. A medicament may be added to the pad 34. When the motor is operated, air is forced out through the medicated pad 34. Such air may be breathed by the user for cold infections and the like.

Under certain conditions, the recess 36, pad 34, fan 30, openings 31 and channels 33 need not be used, and may be omitted.

It is thus to be seen that a new and useful self-contained vibrator and method of making the same have been provided.

While the form of the invention now preferred has been disclosed as required by statute, other forms may be used, all coming within the scope of the claimed subject matter which follows.

What is claimed is:

1. A combination forming a self contained vibrator unit which may be readily held in the hand of a person, comprising: two cupped outer shells with their rims toward each other forming an outer casing; two motor and battery means supporting inner shells having a motor and battery means receiving cavities and each respectively engaging and being located in a different one of said cupped shells; a motor with an eccentric weight and a battery means respectively in said motor and battery means cavities and connected together with an electric circuit means; and means securing said shells together, said casing having two relatively flattened side walls joined by centrally outwardly decidedly arched upper and lower walls and opposite end walls to form a hollow body of relatively long length, one of said ends forming a rounded vibration applying end and the other of said ends forming a handhold end, and with said motor being adjacent said vibration applying end and in which said outer shells are shaped with smooth outer surfaces forming a unitary body having a longitudinal axis of substantial length and in which said cavities are channels with their axes extending transversely to said longitudinal axis.

2. A combination forming a self contained vibrator unit which may be readily held in the hand of a person, comprising: two cupped, outer shells with their rims toward each other forming an outer casing, said shells each having two relatively flattened side walls and a decidedly arched wall joining said flattened side walls; a pair of motor and battery means supporting inner shells each respectively being in engagement with and being located in a different one of said cupped outer shells; a motor with a rotatable eccentric weight and a battery means supported between said inner shells and connected together with an electric circuit means; and means for securing said shells together, said casing having two relatively flattened side walls joined by centrally outwardly decidedly arched upper and lower walls and opposite end walls to form a hollow body of relatively long length, one of said ends forming a rounded vibration applying end and the other of said ends forming a handhold end, and with said motor being adjacent said vibration applying end and in which said inner shells provide a motor receiving cavity construction and a battery means receiving cavity construction to receive said motor and said battery means respectively and in which said cavity constructions consist of a plurality of parallel channels with their axes transverse to said flattened sides.

3. A combination according to claim 1 in which one of said channels receives a motor, and two of said channels receive two batteries.

4. A combination according to claim 3 in which said two batteries are placed in series.

5. A combination according to claim 4 in which a switch structure is placed along one adjacent flattened side and controls said electrical circuit means.

6. A combination forming a self-contained vibrator unit which may be readily held in the hand of a person comprising: a hollow casing having two relatively flattened side walls joined by decidedly arched upper and lower walls and opposite end walls to form a hollow body of relatively long length, one of said ends forming a rounded vibration applying end and with the other of said ends forming a handhold end; a generally cylindrical motor in said casing adjacent said vibration applying end with a shaft transverse to said long length, with a rotatable eccentric weight attached to said shaft; a central cylindrical battery in the central part of said casing transverse to said long length; an end cylindrical battery in said handhold end of said casing; electrical circuit means for connecting said batteries with said motor; and switch means operable from outside said casing controlling said circuit means to energize and deenergize said motor.

7. A combination according to claim 6 in which an inner shell construction is secured inside said casing, said inner shell construction having a motor cavity receiving said motor, and having battery receiving cavities receiving said batteries.

8. A combination according to claim 6 in which said handhold end is a blunt end.

9. A combination according to claim 6 in which said casing is made of plastic material.

10. A combination forming a self-contained vibrator unit which may be readily held in the hand of a person comprising: a hollow casing having two relatively flattened side walls joined by decidedly arched upper and lower walls and opposite end walls transverse to said side walls and said upper and lower walls to form a hollow body of relatively long length, one of said ends forming a rounded vibration applying end and the other of said ends forming a handhold end; a generally cylindrical motor in said casing with a motor shaft transverse to said long length and parallel to said end walls and with a rotatable eccentric weight attached to said shaft; a pair of cylindrical batteries in said casing parallel to said motor shaft; electrical circuit means in said casing for connecting said batteries with said motor; and switch means in said casing operable from outside said casing controlling said circuit means to energize and deenergize said motor.

11. A combination forming a self-contained vibrator unit which may be readily held in the hand of a person comprising: a hollow casing having two relatively narrow flattened generally parallel side walls joined by decidedly wide upper and lower walls and opposite parallel end walls transverse to said side walls and to said upper and lower walls to form a hollow body; an inner casing in said hollow body and attached to said outer casing, said inner casing having a cylindrical motor receiving cavity and a pair of cylindrical battery receiving cavities, said cavities having axes parallel to said end walls; a generaly cylindrical motor in said motor receiving cavity with a shaft parallel to said end walls, with a rotatable eccentric weight attached to said shaft; a pair of cylindrical batteries in said battery receiving cavities with the axes of said batteries parallel to said end walls; electrical circuit means connecting said batteries with said motor; and switch means operable from outside said casing controlling said circuit means to energize and deenergize said motor.

References Cited by the Examiner
UNITED STATES PATENTS

| | | | |
|---|---|---|---|
| 1,473,045 | 11/1923 | Puttaert | 310—50 XR |
| 2,134,960 | 11/1938 | Testi | 128—172 XR |
| 2,159,934 | 5/1939 | Priesg | 240—6.45 XR |
| 2,867,039 | 1/1959 | Zach | 30—34 |
| 3,077,663 | 2/1963 | Tann | 30—34 |

FOREIGN PATENTS

| | | |
|---|---|---|
| 270,003 | 12/1929 | Italy. |
| 265,598 | 3/1950 | Switzerland. |

RICHARD A. GAUDET, *Primary Examiner.*